Nov. 17, 1959  J. F. H. DOUGLAS ET AL  2,913,607
SYNCHRONOUS INDUCTION MOTOR
Filed Jan. 16, 1957  5 Sheets-Sheet 3

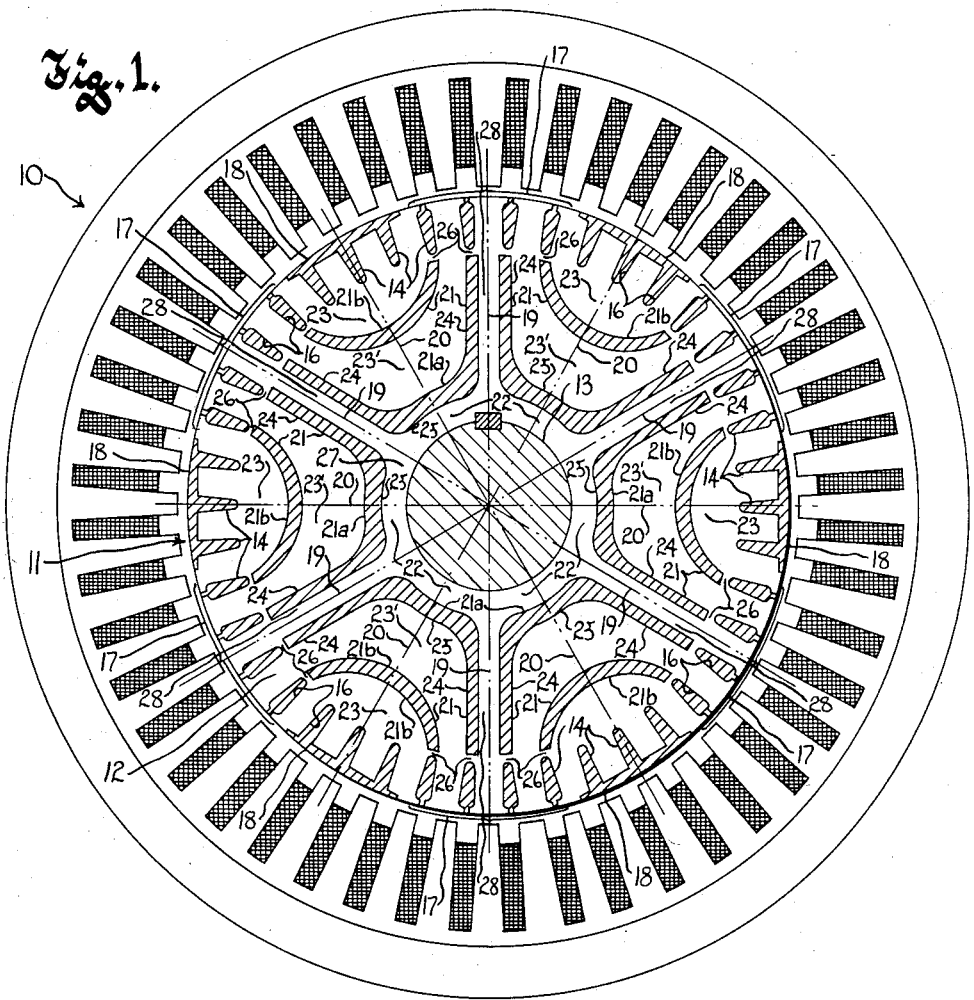

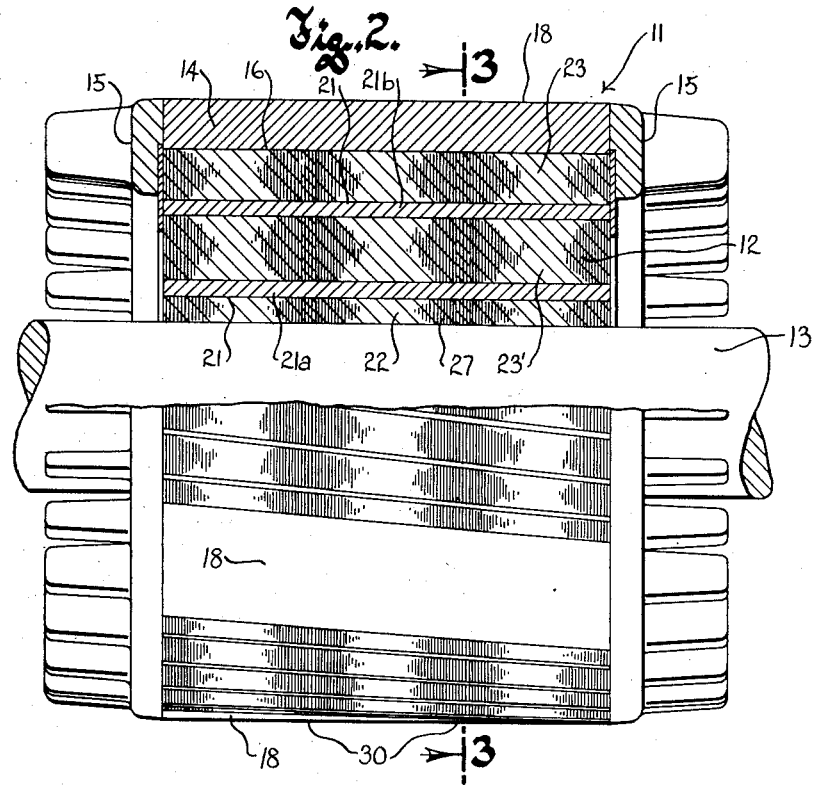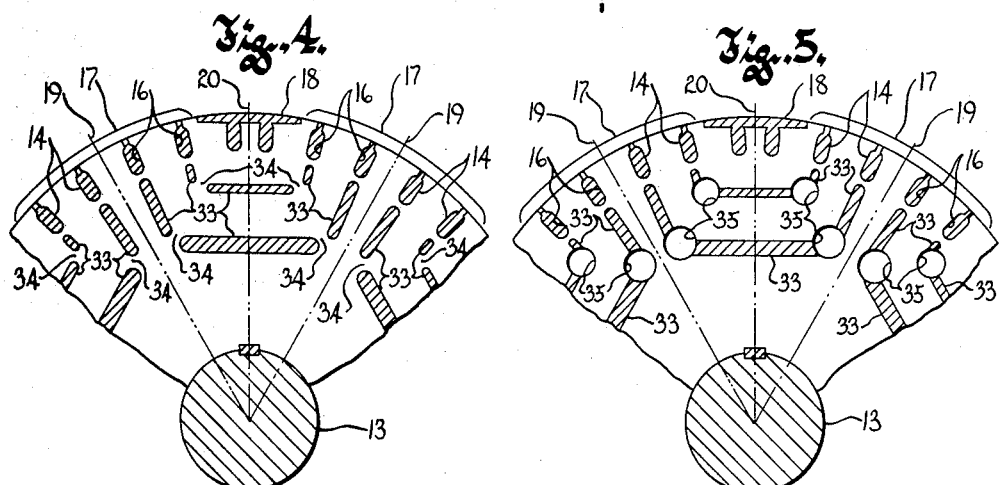

Inventors
John F. H. Douglas
Pentti J. Rautimo

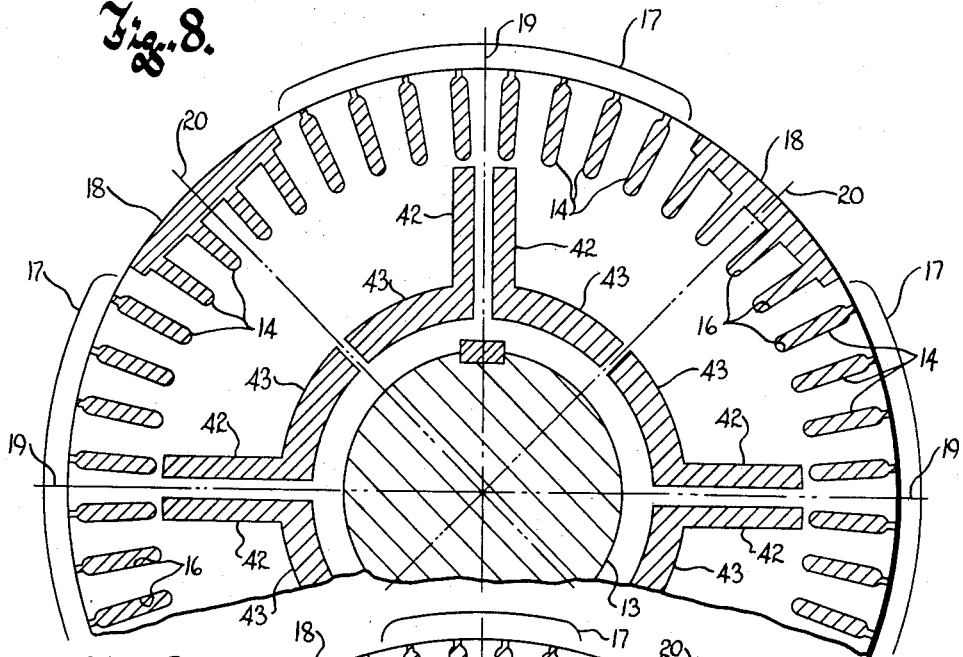
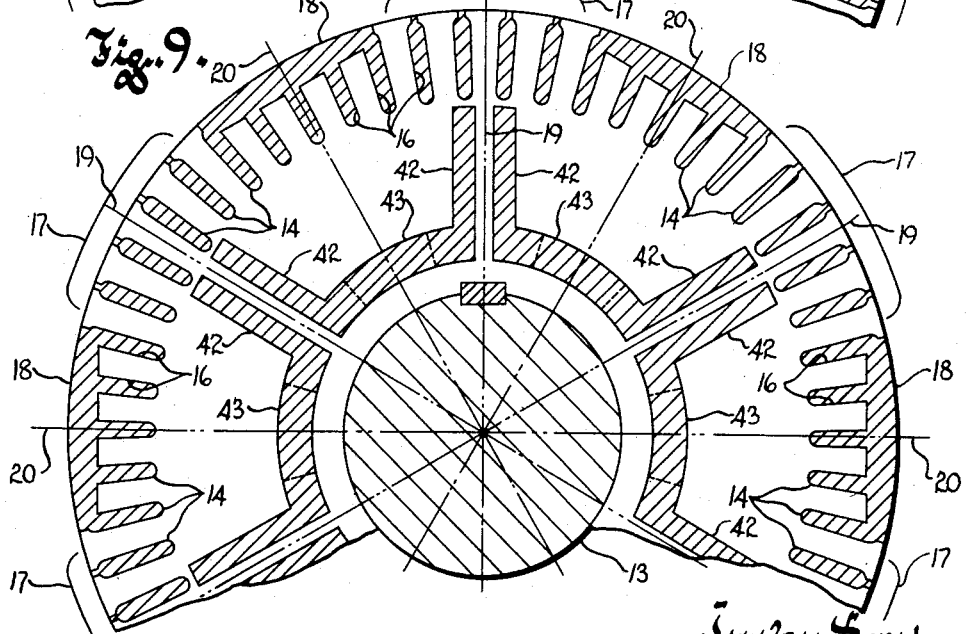

Nov. 17, 1959 — J. F. H. DOUGLAS ET AL — 2,913,607
SYNCHRONOUS INDUCTION MOTOR

Filed Jan. 16, 1957

Inventors
John F. H. Douglas
Pentti J. Rautimo

United States Patent Office 2,913,607
Patented Nov. 17, 1959

2,913,607

SYNCHRONOUS INDUCTION MOTOR

John F. H. Douglas, Milwaukee, and Pentti J. Rautimo, West Allis, Wis., assignors to The Louis Allis Company, Milwaukee, Wis., a corporation of Wisconsin Application January 16, 1957, Serial No. 634,468

10 Claims. (Cl. 310—261)

This invention relates to electric motors and refers more particularly to a synchronous induction motor.

The theory of the synchronous induction motor and its inherent advantages have been known for many years. Articles concerned therewith appeared as early as 1913 (Arnold: Welchselstromtechnik); and, in the November 1923, issue of the A.I.E.E., J. K. Kostko published a rather comprehensive paper on the subject under the title "Polyphase Reaction Synchronous Motors." Kostko's work is also reflected in his Patent No. 1,697,362 issued January 1, 1929. However, despite this long standing knowledge, full use has never been made of this type of motor, principally because of the difficulties heretofore encountered in the fabrication of the sectionalized rotors needed for such motors.

The Bauer et al. Patent No. 2,733,362 issued January 31, 1956, and the Risch Patent No. 2,769,108, issued October 30, 1956, go a long way toward solving these difficulties, but still do not utilize the full capabilities of the synchronous induction principle. In these last named structures completely sectionalized rotors are utilized requiring that the separate magnetic sections and the various paths therein be defined by thick unitary non-magnetic barriers both internal and peripheral to the rotor. These rotor structures are necessarily physically larger and are inherently less efficient than rotors employed, for example, in a standard induction motor of corresponding horsepower so that to package and properly cool a motor employing either of these rotors a substantially larger motor frame size is required. Further, because of the sectionalized rotor structure employed and the mass required for such structure, the rotor has a high ratio of mass to strength character which necessarily limits the safe rotational speed and dictates an upper limit on horsepower ratings.

The broad general purpose of this invention, therefore, is to provide a synchronous induction motor that is better than the prior art has been able to produce, and more specifically, to improve the rotors of such motors, both electrically and mechanically.

To a large extent, the success of a synchronous induction motor depends upon the degree to which quadrature axis or cross axis flux is minimized. Stated in another way, therefore, the general purpose of this invention is to provide a synchronous induction motor having a high ratio of direct to quadrature reactance.

Although it may be superfluous for those skilled in the art, it may be helpful to point out that in a synchronous induction motor, the rotor is so constructed that it has a plurality of defined magnetic poles, equally spaced around its circumference. Each of these poles has a direct polar axis, and the interpolar zones, that is, those portions of the rotor which lie between the poles, are bisected by axes known as quadrature axes. Thus, each quadrature axis bisects the angle defined by the direct polar axes of two adjacent poles.

The rotor is of the squirrel cage type and, hence, has equispaced longitudinally arranged conductors embedded in its peripheral portion and connected at their ends to short circuiting end rings between which the stack of laminations making up the core of the rotor is confined. Each magnetic pole embraces a group of these conductors.

Generally speaking, and especially for optimum performance under synchronous operating conditions, the rotor should be so constructed that practically all of the magnetic flux crossing the air gap from the stator to the rotor will be useful flux. To achieve this result, the flux must enter and leave the rotor only at its magnetic poles. This ideal condition presupposes elimination of all quadrature or cross axis flux, which enters and leaves the rotor at its interpolar zones. The desirability of coming as close as possible to this ideal situation has, of course, been recognized for a long time, but heretofore all rotors of synchronous induction motors, including those of the Bauer et al. and Risch patents, were poor compromises of the ideal condition.

The present invention comes much closer to reaching the goal through a new and improved way of guiding the flux flowing in the rotor, whereby the direct axis flux flows from pole to pole through a plurality of well defined easy paths separated from one another by a plurality of very effective flux "barriers" which lie athwart the paths of quadrature or cross axis flux. But the really significant attainment of this invention is that this result is achieved with an inexpensive construction that enables reduction in size for any given hp. rating, and does not physically weaken the rotor construction.

Tests conducted with motors constructed in accordance with this invention have shown the following advantages:

(1) Increased ratio of pull-in and pull-out torque to locked rotor amperes.

(2) Increased ratio of pull-in and pull-out torque to weight and size of motor.

(3) Improved running efficiency.

(4) Improved ratio of weight to size of motor.

(5) Improved running power factor.

(6) Lower manufacturing cost as compared to other known types of synchronous and synchronous induction motors.

(7) Increased mechanical strength for the rotor so as to better withstand high running speeds.

(8) Reduction in starting current.

Bearing in mind that the embodiments of the invention hereinafter specifically described, are but examples of the best modes in which the principles of the invention thus far have been embodied to achieve the advantages above enumerated, and recognizing that such changes in the described structures as some within the appended claims may be made and still attain the objectives of the invention, reference is now made to the accompanying drawings.

In these drawings:

Figure 1 is a cross sectional view through a synchronous induction motor illustrating one embodiment of this invention, and wherein the rotor has six poles and each pole is linked to its neighbors by three well defined direct axis flux paths;

Figure 2 is a view partially in side elevation and partially in longitudinal section, of only the rotor of the motor shown in Figure 1;

Figure 3 is a cross sectional view through Figure 2 on the plane of the line 3—3, to illustrate a detail in the construction of the rotor by which its mechanical strength is improved;

Figure 4 is a plan view of a portion of a rotor lamination illustrating another way in which the flux guiding paths may be produced and arranged;

Figure 5 is a view similar to Figure 4, but showing how a rotor made with laminations of the configuration depicted in Figure 4 can be easily improved to still further guard against unwanted quadrature or cross axis flux;

Figures 8 and 9 are plan views of rotor laminations, which together illustrate how the invention lends itself to use of a single punching tool in producing the desired configuration of the rotor laminations even though the rotors have different numbers of poles, for instance four poles or six poles;

Figure 6:
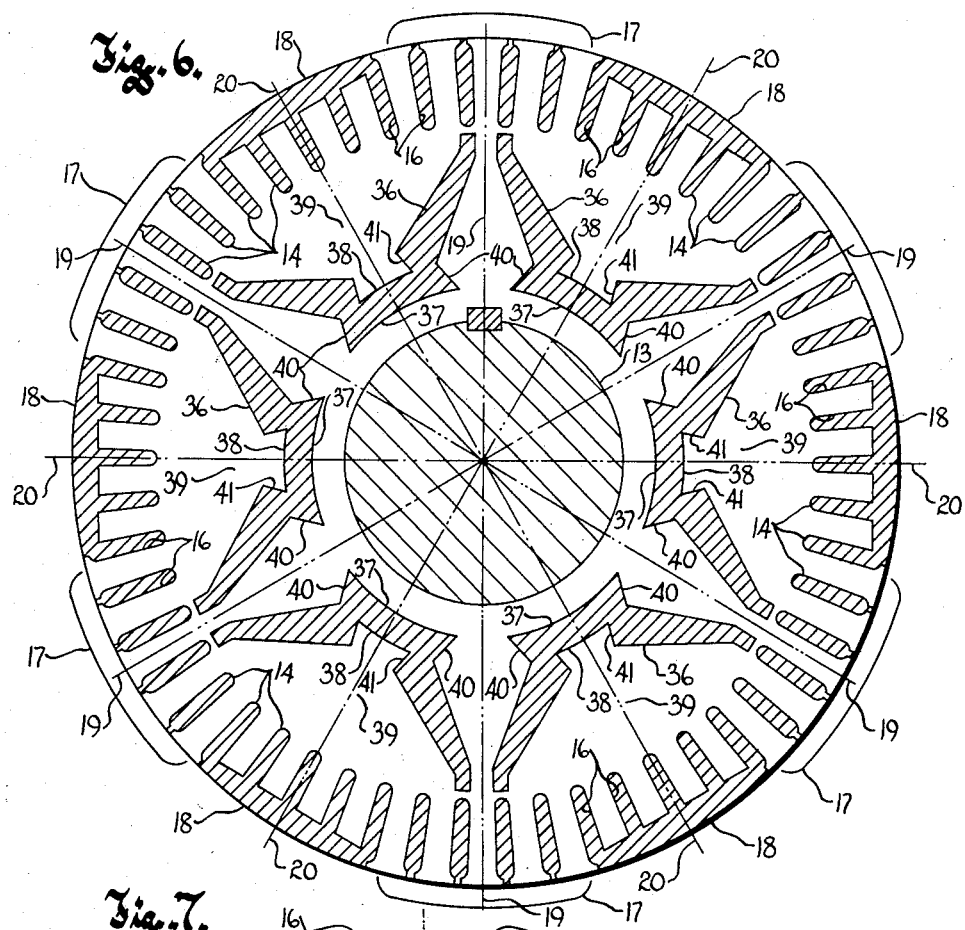
Figure 6 is a plan view of a rotor lamination embodying the invention in a form especially good from the standpoint of mechanical strength.

Referring now particularly to the accompanying drawings, and especially to Figure 1, the numeral 10 designates generally the stator of a synchronous induction motor embodying this invention in one form thereof. The stator is of conventional design with the customary polyphase distributed winding.

The rotor 11 which operates within the stator is of the squirrel cage type and accordingly comprises a core 12 of ferromagnetic metal which is mounted upon and keyed to a shaft 13 also of ferromagnetic metal, and journalled in the customary bearings of the motor (not shown). Equispaced longitudinally arranged conductors 14 are embedded in the peripheral portion of the core and are connected at their extremities by short circuiting end rings 15. The core 12 is composed essentially of a stack of laminations, each punched from ferromagnetic sheet metal, with the complete stack confined between the end rings 15. The conductor bars are somewhat skewed in their arrangement about the periphery of the rotor core and, as is customary, are formed by filling slots 16 in the periphery of the core with aluminum or other suitable nonmagnetic metal. Following customary practice, the nonmagnetic conductor bars and the end rings which connect the ends thereof and between which the stack of laminations is confined, preferably are die cast of aluminum, though, of course, it should be understood that the invention is not limited to any specific manner of constructing these conventional parts of the rotor.

The rotor is constructed to in effect have a plurality of salient poles 17—six in the embodiment of the invention shown in Figure 1—defined by circumferentially spaced interruptions 18 in the periphery of the core. Each of these poles 17 is symmetrical about a direct polar axis 19, and the interpolar zone which lies between each pair of adjacent poles, is symmetrical about a quadrature axis 20 that bisects the angle defined by the adjacent direct polar axes.

Each pole 17 embraces a group of the conductor bars 14, and the arcuate length of the peripheral interruptions 18 is between 20% and 40% of the pole pitch, that is, the arcuate distance on the periphery of the core between adjacent polar axes.

As is well known to those skilled in the art, it is important, if the motor is to have satisfactory operating characteristics, especially for synchronous operation, for as much as possible of the flux which crosses the air gap between the stator and rotor, to enter one pole and leave the rotor through another pole. Flux which enters a pole at one point and leaves the rotor at another point on the same pole, therefore, is generally useless, and likewise, quadrature or cross axis flux which tends to link the interpolar zones, is objectionable and should be eliminated as far as possible.

In the rotor of this invention, the direct axis flux follows well defined low reluctance flux paths separated from one another by appropriately located and shaped interruptions 21 in the ferromagnetic mass of the rotor, which may be considered flux guiding "barriers."

It is realized that the term "barriers" as employed herein to designate the interruptions 21 in the ferromagnetic mass of the rotor, in a sense is a misnomer, since no substance exists which will actually insulate against magnetic flux. It may also be somewhat of a misnomer since these "barriers" from the electrical standpoint, need not be physical bodies, but simply air gaps. However, the term has been chosen as the most convenient to describe the means by which the desired flux paths are established and cross axis or quadrature axis flux greatly minimized, if not entirely prevented.

The specific form or shape of the flux guiding barriers 21 and their locations in the core may be varied to suit different requirements of the motor, but in all instances, they are so arranged that angularly adjacent openings lie at opposite sides of each direct polar axis and form at least two radially spaced well defined low reluctance flux paths linking each pole with its adjacent poles. Thus, in every instance, there is an inner flux guiding path 22 and at least one outer path 23 linking each pole with its adjacent poles, and in that embodiment of the invention shown in Figure 1, a third intermediate path 23' is provided. These paths are defined and separated from one another by two flux barriers 21, disposed in radially spaced relation.

The radially innermost flux barrier, designated 21a, has two angularly disposed straight legs 24 connected by an arcuate portion 25, and the radially outer flux barrier 21b is arcuately shaped as shown, and lies between the legs 24. In each instance, the radially outer extremities of the barriers lie closely adjacent to, but inwardly spaced from, the bottoms of adjacent winding slots 16. The distance the extremities of the flux barriers are spaced from the bottoms of the winding slots is such that the intervening neck 26 of ferromagnetic metal will be saturated at a relatively low percentage of the maximum flux, definitely not more than 20%.

In order for the flux paths 22, 23 and 23' to link adjacent poles 17, it follows, of course, that the extremities of the barriers should lie opposite winding slots embraced by the poles, and as will no doubt be appreciated, the barriers extend longitudinally for the full length of the rotor core.

The relative shapes of the flux barriers 21a and 21b are such that the flux paths defined thereby are as short and direct as possible, without having any portion thereof narrower than the minimum distance between winding slots.

It is particularly important to note that the inner flux paths 22 include not only the hub portion 27 of the core, but also the shaft 13. This follows from the fact that the flux barriers 21a are so shaped and disposed that they define angularly spaced spoke-like arms 28 which lie on the direct polar axes and extend unbrokenly from the bore in the core to the periphery of the rotor. Not only does this have the advantage of utilizing the shaft as part of the magnetic circuit and thereby enabling reduction in size of the rotor, but, in addition, because the hub portion is unbroken, it achieves great mechanical strength and a reliably solid fit between the core and the shaft.

It is also important that the flux guiding barriers 21 in every case lie athwart the paths of quadrature or cross axis flux. The resulting duplication of the impediment to quadrature axis or cross axis flux created by the barriers reduces this unwanted flux to a minimum.

As already pointed out, from an electrical standpoint, the barriers 21 could be simply slits or openings in the core, but for mechanical strength, it is preferable that the interruptions in the core which define the barriers, be filled with nonmagnetic conducting metal. Also, it is preferable that the same nonmagnetic conducting metal be used both for the conductor bars 14 which fill the winding slots in the peripheral portion of the rotor and for the flux barriers. This enables the flux barriers, as well as the conductor bars, to be formed of die cast aluminum in the conventional manner, it being understood that the slits or openings in the core which define the flux barriers, as well as the winding slots, have open communication with those portions of the die casting mold which form the end rings, so that during the die casting operation, entry of the molten metal into all of the spaces to be filled thereby is readily effected. It should also be understood that those parts of the ends of the barrier-forming slits or openings which lie outside the compass of the end rings 15, are closed by the adjacent walls of the mold during the die casting operation.

The peripheral interruptions 18 which define the salient poles 17, contrary to prior practice as represented by the Bauer et al. Patent No. 2,733,362, and the Risch Patent No. 2,769,108, are considerably shallower than the winding slots 16. Also, it is preferable that these interruptions 18 have flat bottoms so that the same notching or punching tool can be used to form the interruptions in rotor laminations of different diameters.

The circumferential length of the interruptions 18, as already noted, is approximately twenty percent to forty percent of the pole pitch; and the minimum depth of the interruptions on the quadrature axis is approximately ten times the air gap between the periphery of the rotor and the adjacent bore of the stator, but this latter dimension is not critical. The actual depth of the interruption may vary and depends upon the balance desired between the electrical and mechanical properties required for any particular motor. An important feature of the invention, however, is that the depth of the interruptions at all times will be less than the depth of the winding slots. By virtue of this dimensional relationship between the depth of the interruptions and the winding slots, strength is built into the rotor at a point where prior art devices, such as that of the Bauer et al. and Risch patents were weak. The weakness of the prior art structures resulted from the fact that a relatively deep peripheral interruption was relied upon to gain much of the reduction in cross axis or quadrature axis flux. As a result, the bar of nonmagnetic metal filling the interruption had a high ratio of mass to strength against deflection by centrifugal force. By contrast, the relatively flat bar of nonmagnetic metal which fills each shallow interruption 18, together with the conductor bars filling the winding slots that open to the bottom of the interruption, form an integral beam-like member which is strong against deflection by centrifugal force. There is, therefore, no need for bolts or other fastening means to tie the nonmagnetic bars 18 to the rotor shaft, as in the Bauer et al. patent, or for retaining rings or bands such as employed in the Risch patent.

On larger rotors where additional strength against centrifugal force may be desirable, the rotor may be equipped with special intermediate laminations 30, formed of suitable nonmagnetic metal, such as stainless steel; and in the rotor of Figure 1, two groups of such special laminations are provided. These special laminations (see Figure 3) have holes or ports 31 so placed as to enable the openings in the ferromagnetic core which define the flux barriers at opposite sides of the laminations, to be communicated with one another so that the molten metal will flow into and fill these openings during the die casting operation.

In that embodiment of the invention illustrated in Figure 1, the flux barriers are continuous from one extremity thereof to the other. This is entirely satisfactory in most instances, and especially where the diameter of the rotor is not so large that the segment-like portions of the individual laminations which result from the punching of the barrier defining openings or slits, are apt to become deranged during the handling of the punched laminations preparatory to assembly into the stacks which comprise the rotor cores. Where additional strength is needed, the openings which define the flux barriers may consist of a series of short slits 33 disposed end-to-end, as shown in Figure 4. Collectively, the two series of slits 33 here shown, are disposed substantially as are the continuous slits defining the barriers 21 in Figure 1, so that the net result will be an innermost flux path including the hub portion and shaft, an intermediate flux path, and an outer flux path, all linking adjacent magnetic poles, with angularly adjacent barriers lying at opposite sides of each direct polar axis, and with the flux barriers all lying athwart the paths of cross axis or quadrature axis flux.

It is important, however, that the necks 34 of ferromagnetic metal which separate the adjacent slits or openings 33 and are provided to ensure against derangement of the parts of the individual laminations during handling, be narrow enough to be saturated with a relatively low value of flux.

Where it is found that even the small amount of quadrature or cross axis flux that can pass through the bridging necks 34 is objectionable, the necks can be removed by drilling or milling operations after the rotor is completed, as indicated in Figure 5, which shows the removal of the necks 34 by the formation of drilled holes 35. Obviously, if desired, the drilled holes 35 can be filled with nonmagnetic metal.

Mechanical strength can also be built into the rotor by proper shaping of the slits or interruptions in the core which define the flux barriers, as shown, for instance in Figure 6. In this case, there is only one inner flux path and one outer flux path linking each pair of adjacent poles, but the flux barrier 36 therebetween is so shaped that it produces dovetail shaped keys 37 and 38 which tie the segments 39 to the hub portion 27. This result follows from the fact that the sides 40 and 41 of the dovetail shaped keys are nonradial and, hence, at least partially transverse to the lines of centrifugal force acting upon the rotor.

Another advantage of this invention lies in the fact thta it enables the same punching tool to be used in the formation of the slits or openings in the core laminations which collectively define the flux barriers for more than one even number of poles with which the rotor is to be equipped. To utilize this advantage, as shown in Figures 8 and 9, the interruptions or openings in the rotor laminations which are to define the flux barriers may be shaped so as to have straight leg portions 42 and arcuate hub portions 43. The arcuate hub portions 43, however, must be of a length such that when laminations for a four pole rotor are being punched, their extremities are spaced slightly apart (as in Figure 8), but when laminations for a six pole rotor are being punched, the arcuate portions 43 overlap (as in Figure 9). A single punching tool having right and left hand punches forms the openings in each case.

Figure 7:
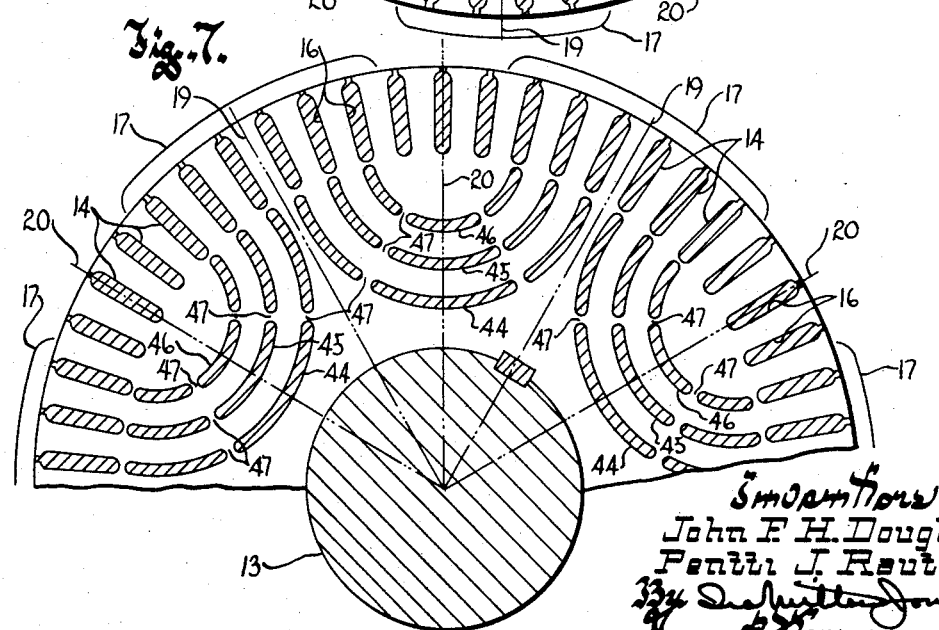
Figure 7 is a plan view of a portion of a rotor lamination illustrating still another embodiment of this invention, and one in which the magnetic poles are produced without need for the peripheral interruptions in the rotor core which are usually employed to define the several magnetic poles.

Ordinarily, the rotor of this invention will have salient poles defined by circumferentially spaced peripheral interruptions as hereinbefore described, but it is also possible to provide the required poles without actually using such interruptions. This may be done, as shown in Figure 7, by arranging the flux guiding barriers in angularly spaced sets or groups at opposite sides of each direct polar axis, with each set or group comprising three radially spaced barriers 44, 45 and 46. Each of these flux barriers consists of a series of end-to-end arcuate slits punched into the laminations of the rotor and spaced apart by short saturable necks 47. As in the other embodiments of the invention, the flux barriers may be open interruptions in the ferromagnetic mass of the core, or they may be defined by such openings or interruptions filled with suitable nonmagnetic metal. In either case, the barriers lie athwart the paths of quadrature or cross axis flux and by their duplication effectively negative the quadrature axis flux and define the poles as well as the low reluctance flux paths linking the poles.

Those skilled in the art no doubt understand that the assembled rotor is turned down in a lathe to its correct diameter, and that by such machining the radially outer extremities of its winding slots are opened to expose the conductor bars therein, as shown in all views of the drawing thus far described. But, to preclude any misunderstanding, Figures 10 and 11 are included to illustrate the condition of the rotor laminations as they are punched out and before assembly into a finished rotor.

Figure 10:
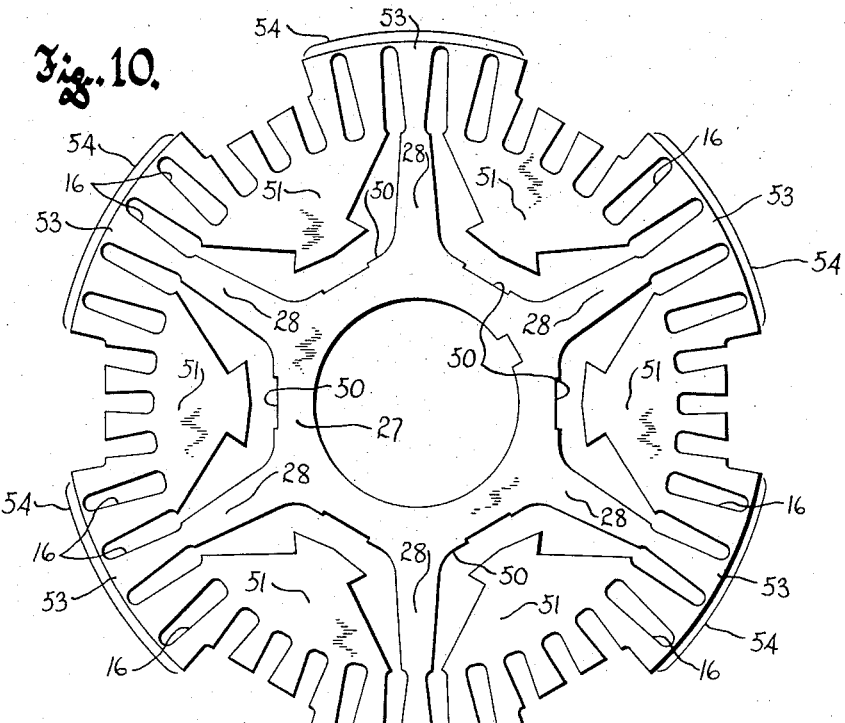
Figure 10 is a plan view of a single lamination for a six pole rotor, embodying the invention in a form somewhat similar to that illustrated in Figure 6, and depicting the lamination in its condition directly after being punched out rather than as it appears in a finished turned-down rotor.
Figure 11:
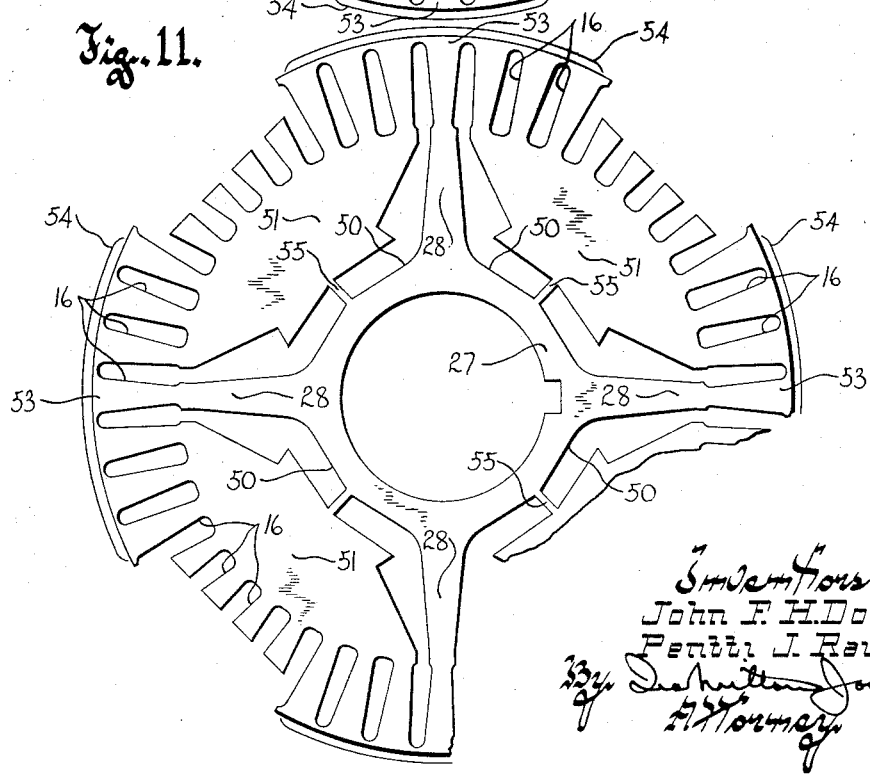
Figure 11 is a plan view of a portion of a lamination as shown in Figure 10, but for a four pole rotor.

Figure 10 depicts a lamination for a six pole rotor and Figure 11 shows part of a lamination for a four pole rotor. In each instance, generally U-shaped openings 50 are punched into the lamination at opposite sides of each direct polar axis to provide the flux barriers in the finished rotor. These openings 50 define the radially extending equispaced arms 28 which together with the hub portion 27, provide the radially inner flux paths, and also define the segments 51 which provide the radially outer flux paths.

The radially outer extremities of the openings 50 in these laminations, actually connect with the bottoms of the adjacent winding slots 16, and in this respect differ from the constructions hereinbefore described. However, this is an immaterial difference which depends simply upon whether or not a neck or bridge is needed at this point to hold the segments 51 against derangement during handling of the lamination preparatory to and during its assembly into a rotor. For maximum effectiveness of the flux barriers formed by the openings 50, the construction shown in Figures 10 and 11 is preferable; but, as noted hereinbefore, as long as the necks or bridges separating the extremities of the barriers from the adjacent winding slots are small enough to be readily saturated with a small percentage of maximum flux, their presence is not objectionable. Hence, where the claims hereof refer to the positional relationship between the extremities of the flux barriers and the adjacent winding slots, the term "contiguous" is employed to denote the construction of Figures 10 and 11, as well as that of the other figures.

In the lamination shown in Figure 10, the segments 51 are held to the rest of the stamping by the unbroken peripheral portions 53 which lie outwardly of the winding slots in the salient pole forming portions 54, and thus connect the teeth formed by the areas between winding slots. These peripheral portions are, preferably, removed or substantially reduced by the final machining of the finished rotor. In the four pole lamination of Figure 11 where the segments 51 are wider, additional assurance against displacement of the segments is afforded by narrow necks 55 across the medial portions of the openings 50.

Figures 10 and 11 also provide another illustration of the way in which this invention lends itself to cost reduction, since the openings 50 in each case, are formed by the same punching tool, the disc simply being indexed farther around when punching the four pole lamination of Figure 11 so as to leave the bridging necks 55.

From the foregoing specification, taken with the accompanying drawings, it will be readily apparent to those skilled in this art, that this invention provides the means by which the capabilities and advantages of the synchronous induction motor can be exploited to the fullest extent, since it enables the designer to combine mechanical strength and simple inexpensive fabrication with optimum electrical performance.

What is claimed as our invention is:

1. In a synchronous induction motor having a stator with a polyphase distributed winding and a rotor of the squirrel cage type wherein a cylindrical core of ferromagnetic metal has uniformly circumferentially spaced winding slots with conductors of nonmagnetic metal therein extending longitudinally through its peripheral portion with the nonmagnetic conductors short circuited by end rings also of nonmagnetic metal, said rotor having circumferentially spaced magnetic poles each of which embraces a group of said winding slots, and each of which has a direct polar axis extending radially out from the rotor axis, and said rotor being characterized by: a plurality of nonmagnetic flux guiding barriers in the core of the rotor, each of which extends inwardly from a point contiguous to the bottom of one of said winding slots embraced by one pole towards the hub of the rotor and then without reaching the bore in the hub continues outwardly towards the periphery of the rotor to a point contiguous to the bottom of one of said winding slots embraced by an adjacent pole, angularly adjacent barriers lying at opposite sides of the direct polar axes so that said barriers divide the core into radially spaced flux paths linking each pole with its adjacent poles, each of the radially innermost of said flux paths including part of the hub portion of the core, and said nonmagnetic flux guiding barriers lying athwart the paths of quadrature or cross axis flux and extending longitudinally for the length of the core.

2. The structure of claim 1 further characterized by the fact that said nonmagnetic flux guiding barriers are in each instance symmetrical about the interpolar or quadrature axis which lies between and is angularly equidistant from the direct polar axes of each pair of adjacent magnetic poles.

3. The structure set forth in claim 2 further characterized by the fact that a plurality of radially spaced nonmagnetic flux barriers extends between each pair of adjacent magnetic poles with the ends of the radially innermost nonmagnetic barrier closest to the direct polar axes so that each pair of adjacent poles is linked by an inner flux path which includes part of the hub portion of the core and a plurality of separate outer flux paths.

4. The structure of claim 1 further characterized by the fact that each of said nonmagnetic barriers comprises a series of interruptions in the ferromagnetic core separated from one another by narrow necks of the ferromagnetic core metal to give the core mechanical strength without objectionably increasing quadrature or cross axis flux.

5. The structure of claim 1 but wherein the magnetic poles are defined by circumferentially spaced interruptions in the peripheral portion of the ferromagnetic core, each of which interruptions has an arcuate length great enough to encompass a group of winding slots and an included angle which is between 20% to 40% of the angle defined by the direct polar axes of the two magnetic poles between which the interruption is located.

6. The structure of claim 5 further characterized by the fact that said circumferentially spaced interruptions in the peripheral portion of the ferromagnetic core are filled with nonmagnetic metal so that the cylindrical surface of the rotor is maintained, and by the fact that the depth of the said interruptions and the consequent thickness of the nonmagnetic metal filling the same is less than the depth of the winding slots, so that the adjacent winding slots which are embraced by said interruptions extend radially in from the bottom of each of said interruptions, the nonmagnetic metal filling the interruptions and that of the conductors in said adjacent winding slots being homogeneous.

7. In a synchronous induction motor: a rotor of the squirrel cage type having a core of ferromagnetic metal, said core having a bore in its hub to directly receive the rotor shaft and having spaced longitudinally extending short circuited conductors of nonmagnetic conducting metal embedded in its peripheral portion, and circumferentially spaced magnetic poles each embracing a group of said nonmagnetic conductors, said rotor being characterized by: nonmagnetic barriers in the ferromagnetic core defining spoke-like radial arms of ferromagnetic metal, each of which arms extends unbrokenly from the hub of the core along the direct polar axis of one of said magnetic poles to the periphery of the core, and said nonmagnetic barriers also defining radially spaced inner and outer flux paths linking each magnetic pole with its neighbors, the inner flux paths comprising the spoke-like radial arms and the intervening hub portion of the core, and said nonmagnetic barriers lying athwart the paths of quadrature or cross axis flux.

8. The structure of claim 7, further characterized by the fact that the rotor core is made up of an aligned stack of laminations; that the nonmagnetic barriers comprise aligned holes in the laminations filled with nonmagnetic metal; and further characterized by a reinforcing lamination of nonmagnetic metal located inwardly of the ends of the rotor core and having the conductors, and the nonmagnetic barriers anchored thereto.

9. The structure of claim 7 further characterized by the fact that the shaft of the rotor is of ferromagnetic material and is received directly in the bore of the hub so that the inner flux paths include the shaft as well as the hub of the core.

10. The structure of claim 1 further characterized by the fact that said nonmagnetic flux barriers comprise slits in the ferromagnetic core, which slits are filled with nonmagnetic metal; and further characterized by the fact that said slits and the nonmagnetic metal filling the same have engaging surfaces disposed transversely to the direction of centrifugal force acting upon the rotor during rotation thereof to thereby provide mechanical strength for the rotor.

References Cited in the file of this patent

UNITED STATES PATENTS

| | | |
|---|---|---|
| 1,551,271 | Slepian | Aug. 25, 1925 |
| 1,697,362 | Kostko | Jan. 1, 1929 |
| 2,733,362 | Bauer et al. | Jan. 31, 1956 |
| 2,769,108 | Risch | Oct. 30, 1956 |

FOREIGN PATENTS

| | | |
|---|---|---|
| 871,183 | Germany | Apr. 27, 1953 |